United States Patent [19]

Malloy

[11] 4,169,526
[45] Oct. 2, 1979

[54] TORQUE CONVERTER AND TORQUE RESPONSIVE SLIPPING CLUTCH

[75] Inventor: John D. Malloy, Troy, Mich.

[73] Assignee: General Motors Corporation, Detroit, Mich.

[21] Appl. No.: 872,048

[22] Filed: Jan. 25, 1978

[51] Int. Cl.² .................. F16D 39/00; F16D 47/06
[52] U.S. Cl. .................................. 192/3.3; 192/56 F
[58] Field of Search .................. 192/3.3, 3.29, 56 F

[56] References Cited

U.S. PATENT DOCUMENTS

| 2,646,150 | 7/1953 | Hobbs | 192/56 F |
| 3,966,031 | 6/1976 | Peterson et al. | 192/3.3 |
| 4,002,228 | 1/1977 | Borman | 192/3.3 |

*Primary Examiner*—Benjamin W. Wyche
*Attorney, Agent, or Firm*—Donald F. Scherer

[57] ABSTRACT

A torque converter and slipping clutch wherein the ratio of torque split between the clutch and converter is controlled by a lever which, through a valve, controls the differential pressure engaging the clutch.

2 Claims, 2 Drawing Figures

TORQUE CONVERTER AND TORQUE RESPONSIVE SLIPPING CLUTCH

This invention relates to drive systems having a torque converter and slipping clutch and more particularly to such drive systems wherein the torque split between the torque converter and clutch is controlled.

Prior art devices, such as U.S. Pat. No. 4,002,228 issued to Borman on Jan. 11, 1977, disclose torque converter and slipping clutch systems wherein the torque split is determined by the torque transmission. The Borman patent discloses a system wherein a fixed amount of torque passes through the converter before the clutch is engaged. The clutch then absorbs or transmits the remainder of the torque input.

The present invention provides a torque split between a slipping clutch and torque converter such that the ratio of torque split is maintained at a constant value throughout the torque range. That is, the mechanism is designed such that a predetermined ratio of torque transmission is present between the clutch and torque converter. For example, the torque converter may transmit $\frac{1}{3}$ of the total torque input while the clutch transmits the remaining $\frac{2}{3}$.

It is an object of this invention to provide an improved torque converter and slipping clutch wherein the engagement force of the clutch is determined in accordance with the ratio of the torque transmitted by the torque converter and the clutch.

It is another object of this invention to provide an improved torque converter and slipping clutch having a lever, drivingly connected to the torque converter and clutch, which operating a control valve to control the differential engagement on the clutch in accordance with the ratio of the torque transmitted by the torque converter and clutch.

Figure 1:
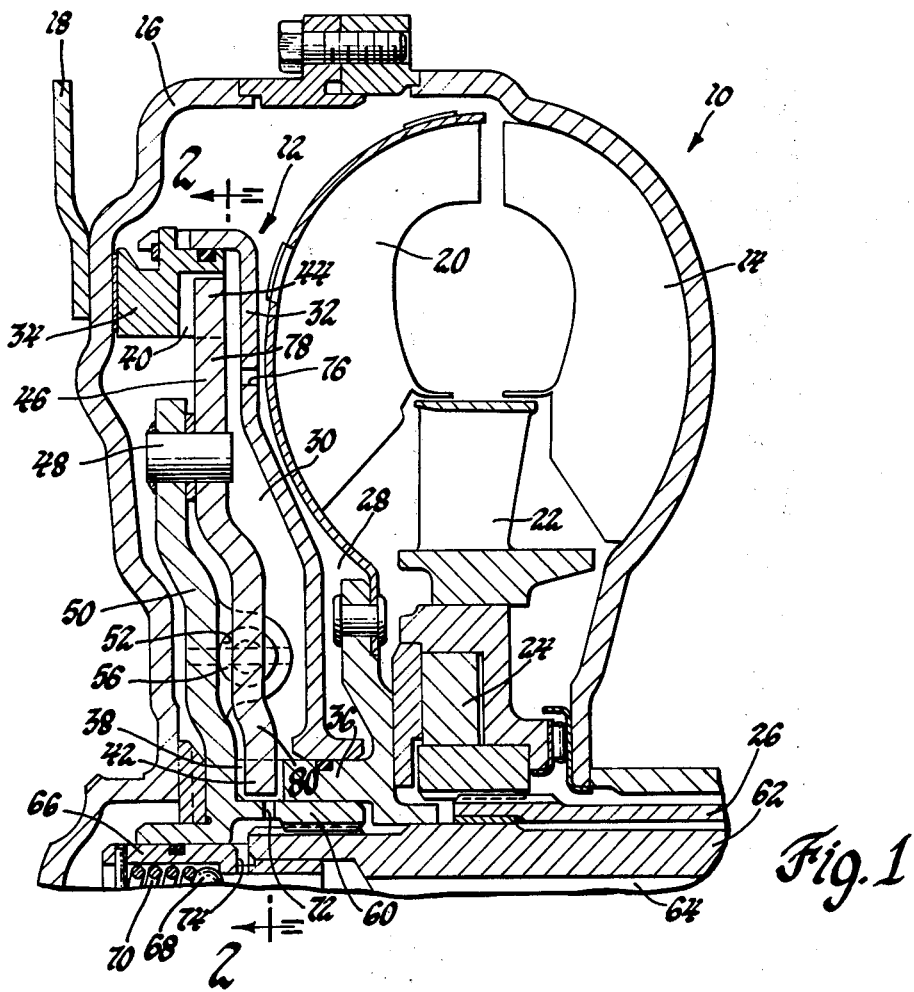
Figure 2:
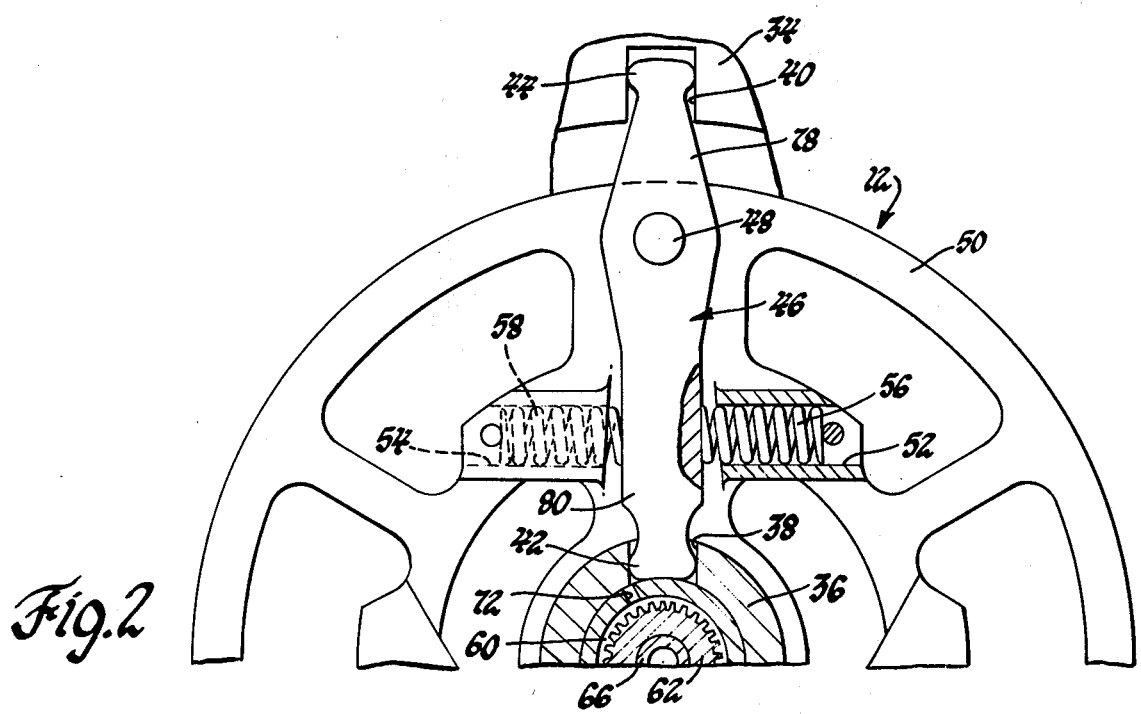

Other objects and advantages of the present invention will be more apparent from the following description and drawings in which:

FIG. 1 is a cross sectional elevational view of a torque converter and clutch; and FIG. 2 is a view taken along line 2—2 of FIG. 1.

Referring to the drawings, wherein like characters represent the same or corresponding parts, there is seen in FIG. 1 a torque converter generally designated 10 and a clutch generally designated 12. The torque converter has an impeller 14 connected to an input shell 16 which is adapted to be connected to an engine, not shown, through a plurality of flanges such as 18. The impeller 14 is in fluid communication with a turbine 20, and a stator 22 which is disposed at the inner periphery of the impeller 14 and turbine 20. This is, as will be appreciated, a conventional torque converter arrangement. The stator is connected through a one way device 24 through a stationary shaft 26.

The input shell 16 and the torque converter 10 form a fluid chamber which is divided into an engagement chamber 28 and a disengagement chamber 30 by the clutch 12. The clutch 12 includes a pressure plate 32 which is drivingly connected to the friction plate 34 adapted to frictionally engage the inner surface of the input shell 16. The pressure plate 32 is slidably disposed on an inner hub 36 of the turbine 20. The turbine 20 and clutch plate 34 each have a plurality of slots such as 38 and 40 respectively in which are disposed ends 42 and 44 of a lever 46. The lever 46 is pivotally mounted on a pin 48 secured in an output hub 50. The output hub 50 as can be seen in FIG. 2 is essentially circular such that levers 46 can be distributed equally such that three or more levers can provide the drive connection between the clutch 12, the turbine 20 and the output hub 50. The output hub 50 has spring pockets 52 and 54 in which are disposed coil springs 56 and 58 respectively. The coil springs 56 and 58 bear against the sides of lever 46 to maintain the lever in a centralized position when the system is inoperable. The spring pockets 52 and 54 have angled extremities which limit the angular pivotal movement of the lever 46 in a clockwise or counterclockwise direction and thereby provide a limiting position for lever pivoting.

The output hub 50 has a splined hub 60 which is drivingly connected to a drive shaft 62. The drive shaft 62 has a passage 64 formed therein and also has a valve assembly 66 secured thereto. The valve assembly is comprised of a sphere 68 and a coil spring 70 which maintains the passage 64 out of fluid communication with the disengagement chamber 30 during desired periods of operation. The hub 36 of turbine 20 is slidably mounted on the outer periphery of hub 60 to permit relative angular movement therebetween during operation of the drive.

The hub 36 and output member 50 cooperate to provide a valve mechanism disposed between the disengagement chamber 30 and the passage 64. The output hub 50 has formed therein one or more passages such as 72 which can be selectively communicated with the disengagement 30 through the slots 38 formed in the turbine hub 36 and passage 74 formed in the valve assembly 66. A fluid passage 76 is formed in the clutch pressure plate 32 and provides a fixed restriction or passage for fluid communication between the engagement chamber 28 and the disengagement chamber 30.

The torque converter 10 is supplied with fluid to permit operation thereof. The control of fluid flow to the torque converter 10 may be accomplished in accordance with the control system shown in U.S. Pat. No. 3,693,478 issued to Malloy on Sept. 26, 1972. The control system mentioned above permits the reversal of fluid through a torque converter, such that when it is desired to disengage the clutch the fluid is admitted through passage 64 and valve assembly 66 to the disengagement chamber 30, which disengages the clutch 12 and permits the fluid to be delivered through the outer periphery of the torque converter to the torus formed by the impeller 14, turbine 20 and stator 22. When it is desired to engage the clutch the fluid flow is reversed such that the fluid enters the torque converter at the inner periphery of the torque converter 10 and is exhausted through the passage 76 and passage 64 under the influence of the controlled passage 72. The clutch is engaged by the differential pressure across the plate 32 in a manner such that, as the pressure is more rapidly exhausted from disengagement chamber 30, the pressure differential will increase on the pressure plate 32 thereby increasing the engagement force of clutch 12. The amount of fluid flow out of chamber 30 is controlled by the opening of passage 72 through the relative angular movement between the turbine hub 36 and the output member 50.

Assuming the torque converter and therefore shaft 62 are rotating in a counterclockwise direction when viewed in FIG. 2, the passage 72 will be opened by the relative angular motion between the turbine 20 and hub 50 such that the pressure in chamber 30 will decrease resulting in an increase in engagement force of the clutch 12. As the clutch 12 is engaged, the drive at the outer end of member 46 through slot 40 and end 44 will be transmitted to the pin 48 and then to the output member 50. As the torque transmitted by the clutch 12 increases, the forces transmitted to the lever 46 will cause relative angular movement between the turbine 20 and the output member 50 such that the passage 72 will be choked off thereby reducing the output flow availability whereby the pressure in chamber 30 will increase which of course will limit further clutch application pressure and thereby reduce the clutch torque transmission. When the ratio of force transmission by the clutch and turbine is equal to the force ratio determined by the lever arms 78 and 80, the passage 72 will be maintained at an open position such that the pressure drop across clutch plate 32 will be sufficient to provide the required engagement force to maintain the force ratio determined by the lever arms 78 and 80. If the clutch should attempt to transmit more torque than the force ratios determined by lever arms 78 and 80 permit, the passages 72 will be further reduced in the opening such that the pressure developed in chamber 30 will increase thereby decreasing the clutch engagement force and maintaining the desired force ratio balance.

During vehicle coasting, such as when the operator releases the throttle, the drive through the system is reversed, and the shaft 62 drives the output member 50. When this occurs, the output 50 is rotated clockwise relative to hub 36 and the passage 72 will be closed even further or shut off completely. When this occurs, the pressure in chamber 30 will rise rapidly thereby fully disengaging the clutch during coasting operation which, as is well known is a desirable function in any lock-up clutch operation. The spring pockets as explained earlier limit the angular pivoted movement of the lever 46 such that during coast, the levers will abut the spring pocket such that further movement of the levers is not permitted and the torque is transmitted entirely through the torque converter back to the engine. This is also true on acceleration or driving when the clutch is disengaged by the control system. In this instance the lever will of course pivot in the opposite direction and the torque will be transmitted by the turbine 20 through the levers 46 to output member 50. However, the levers will be in a limited position by the angular surface on the spring pocket. The lever 46 is shown to have a force ratio of approximately 2:1 however this is not a limiting ratio and many other ratios can be used. The 2:1 force ratio is shown as merely a convenience for the drawing. The torque ratio would be a much greater value such as 10:1 wherein the clutch 12 would transmit ten times the amount of torque transmitted by the turbine 20 since the torque arm for the clutch force, for example, distance from end 44 to the center of about 62, is greater than the torque arm for the turbine force, for example, distance from end 42 to the center of shaft 62. Thus if the torque arm for the clutch force is five times the torque arm for the turbine force, the torque ratio is 10:1. It is of course appreciated that the more torque that is transmitted through the clutch the higher the efficiency of the unit.

Obviously, many modifications and variations of the present invention are possible in light of the above teaching. It is therefore to be understood, that within the scope of the appended claims the invention may be practiced otherwise than as specifically described.

What is claimed is:

1. A torque converter and slipping clutch comprising; an input shell adapted to be driven by a power source; torque converter means having an impeller, driven by said input shell, and a turbine; clutch means, disposed between said input shell and said turbine, being responsive to fluid pressure on opposite sides thereof for controlled frictional engagement with said input shell; output means for delivering power from said torque converter means and clutch means; lever means pivotally mounted on said output means and being drivingly connected with said clutch means and said torque converter means for transmitting torque to said output means from said clutch means and said torque converter means; and valve means responsive to the ratio of torque transmitted by said clutch means and said torque converter means through said lever means for controlling the exhausting of fluid pressure from one side of said clutch means to maintain the engagement of said clutch means such that the torque transmitted by said clutch means is at a predetermined proportion of the total torque transmitted to said output means.

2. A torque converter and slipping clutch comprising; an input shell adapted to be driven by a power source; torque converter means having an impeller, driven by said input shell, and a turbine; clutch means, disposed between said input shell and said turbine, being responsive to fluid pressure on opposite sides thereof for controlled frictional engagement with said input shell; output means for delivering power from said torque converter means and clutch means; lever means pivotally mounted on said output means and being drivingly connected with said clutch means and said torque converter means for transmitting torque to said output means from said clutch means and said torque converter means; and valve means comprising a slot on said turbine and a fluid passage in said output means responsive to the ratio of torque transmitted by said clutch means and said torque converter means through said lever means for controlling the position of said slot relative to said fluid passage thereby controlling the exhausting of fluid pressure from one side of said clutch means to maintain the engagement of said clutch means such that the torque transmitted by said clutch means is at a predetermined proportion of the total torque transmitted to said output means.

* * * * *